United States Patent
Guha et al.

(10) Patent No.: US 10,757,720 B2
(45) Date of Patent: Aug. 25, 2020

(54) DYNAMICALLY PLACING AN INTERNET PROTOCOL ANCHOR POINT BASED ON A USER DEVICE AND/OR AN APPLICATION

(71) Applicant: Verizon Patent and Licensing Inc., Arlington, VA (US)

(72) Inventors: Ratul Kumar Guha, Kendall Park, NJ (US); Hans Raj Nahata, New Providence, NJ (US); Kalyani Bogineni, Hillsborough, NJ (US); Jignesh S. Panchal, Hillsborough, NJ (US)

(73) Assignee: Verizon Patent and Licensing, Inc., Basking Ridge, NJ (US)

( * ) Notice: Subject to any disclaimer, the term of this patent is extended or adjusted under 35 U.S.C. 154(b) by 95 days.

(21) Appl. No.: 16/124,958

(22) Filed: Sep. 7, 2018

(65) Prior Publication Data
US 2020/0084781 A1 Mar. 12, 2020

(51) Int. Cl.
| H04W 72/12 | (2009.01) |
| H04W 72/04 | (2009.01) |
| H04W 8/08  | (2009.01) |
| H04W 80/04 | (2009.01) |

(52) U.S. Cl.
CPC ....... *H04W 72/1242* (2013.01); *H04W 8/085* (2013.01); *H04W 72/0493* (2013.01); *H04W 80/04* (2013.01)

(58) Field of Classification Search
CPC .................................................. H04W 36/00
See application file for complete search history.

(56) References Cited

U.S. PATENT DOCUMENTS

| 2007/0297388 | A1* | 12/2007 | Appaji | H04L 12/66 |
| | | | | 370/351 |
| 2019/0053117 | A1* | 2/2019 | Bae | H04W 36/165 |

* cited by examiner

*Primary Examiner* — Sulaiman Nooristany

(57) ABSTRACT

A device determines whether an application, utilized by a user device and associated with a network, is a low latency application or a best effort application. The device designates a first network device or a second network device as a designated network device to be an IP anchor point for the application based on a set of rules. The first network device is designated as the designated network device when the application is the low latency application, or the second network device is designated as the designated network device when the application is the best effort application. The device provides, to the user device, information informing the user device that the designated network device is to be the IP anchor point for the application, and provides, to the network, information instructing the network to utilize the designated network device as the IP anchor point for the application.

20 Claims, 12 Drawing Sheets

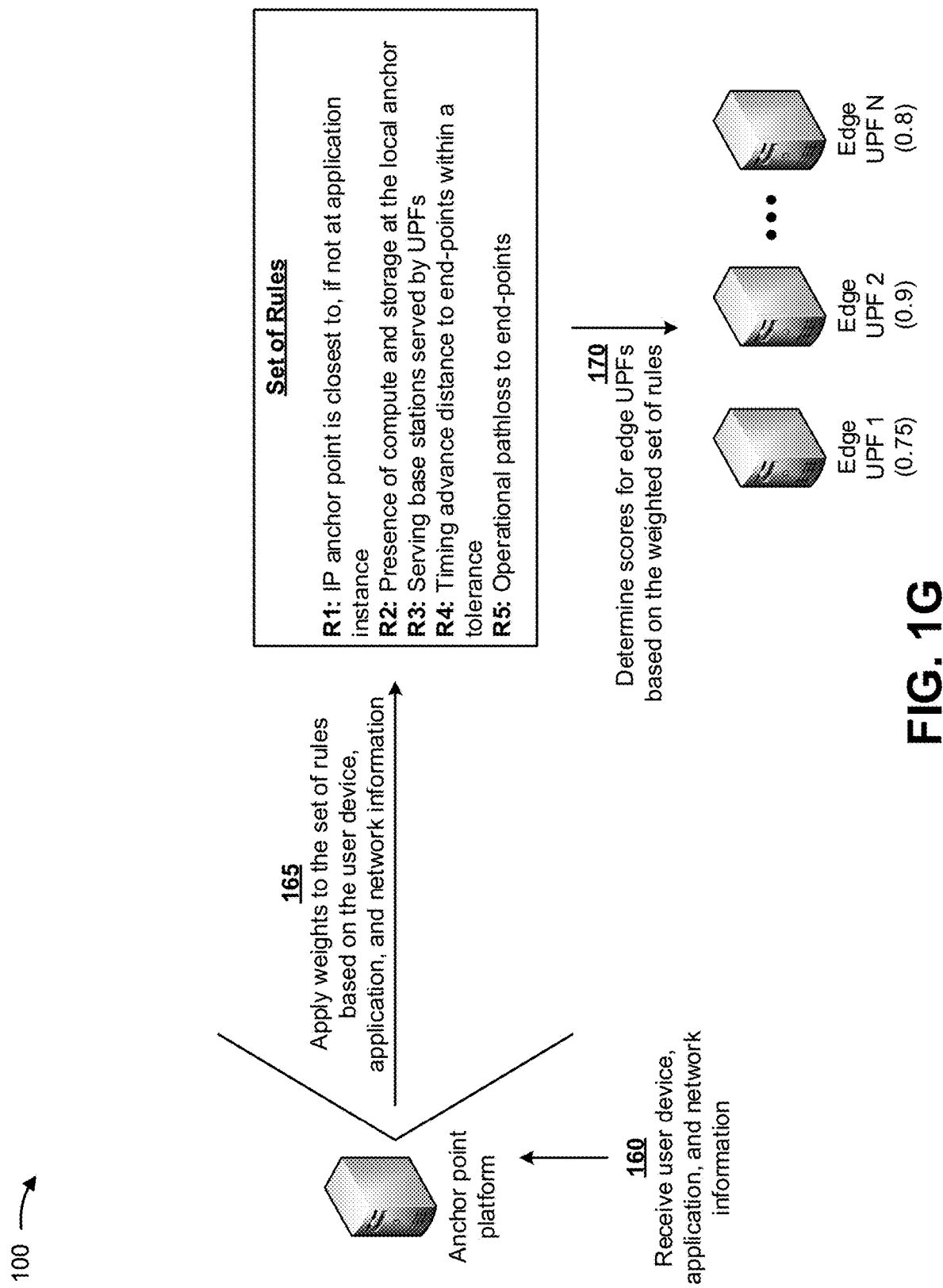

US 10,757,720 B2

DYNAMICALLY PLACING AN INTERNET PROTOCOL ANCHOR POINT BASED ON A USER DEVICE AND/OR AN APPLICATION

BACKGROUND

Network functions (e.g., control plane functions and/or user plane functions), or partial functionalities, are statically placed in existing network deployments depending on a type of network. For example, in a fourth generation (4G) or long-term evolution (LTE) network, network functions can be statically placed in a base station (e.g., an eNodeB or eNB), a packet data network gateway (PGW), a serving gateway (SGW), a mobility management entity (MME), and/or the like. In a fifth generation (5G) network or New Radio (NR) network, network functions can be statically placed in a base station (e.g., a next generation NodeB or a gNB), a network slice selection function (NSSF), a unified data management (UDM) component, an access and mobility management function (AMF), a session management function (SMF), and/or the like.

BRIEF DESCRIPTION OF THE DRAWINGS

FIGS. 1A-1H are diagrams of an example implementation described herein.

DETAILED DESCRIPTION OF PREFERRED EMBODIMENTS

Figure 1A:
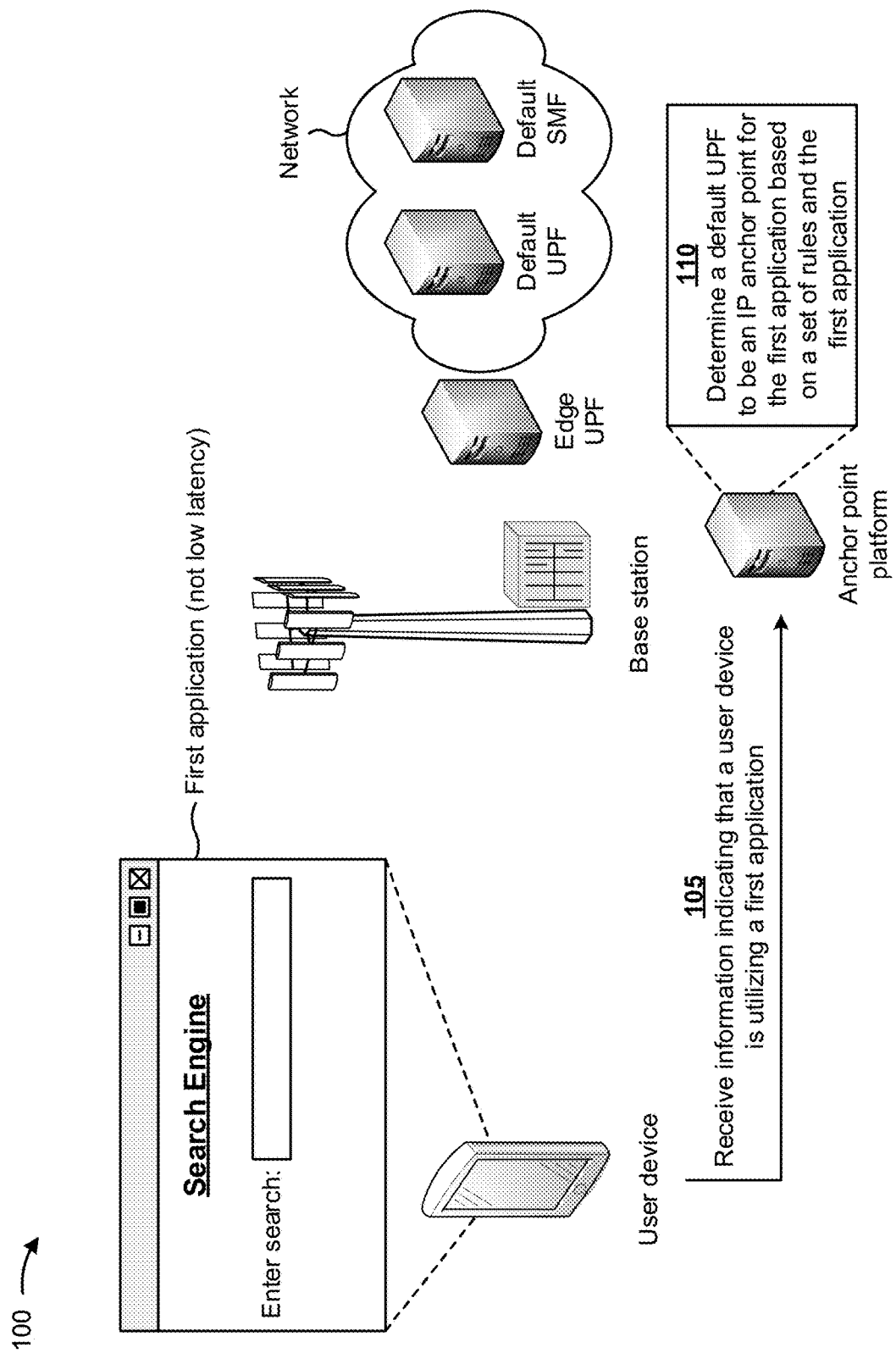

The following detailed description of example implementations refers to the accompanying drawings. The same reference numbers in different drawings can identify the same or similar elements.

User devices (e.g., user equipment or UEs) and applications associated with user devices can include different sets of network and/or business requirements that are optimally realized by different network topologies and resources for network functions and/or functionalities such as, for example, close to the user devices and/or the applications. For example, some applications (e.g., autonomous vehicle-to-vehicle (V2V) communications, augmented reality, virtual reality, and/or the like) provided by the user devices require low latency. Thus, such applications require network functions and/or functionalities to be placed (e.g., anchored) in network devices that are located closer (e.g., geographically closer, closer in terms of network hops, and/or the like) to the user devices and/or the applications. However, since network functions and/or functionalities are statically placed in existing network deployments, such deployments are unable to place network functions and/or functionalities in network devices that are located closer (e.g., geographically closer, closer in terms of network hops, and/or the like) to such user devices and/or applications.

Some implementations described herein provide an anchor point platform that dynamically places an Internet protocol (IP) anchor point based on a user device and/or an application utilized by the user device. For example, the anchor point platform can receive information indicating that a user device is utilizing an application associated with a network, and can determine whether the application is a low latency application or a best effort application (e.g., an application that does not require low latency). The anchor point platform can designate a first network device of the network or a second network device of the network as a designated network device to be an IP anchor point for the application based on a set of rules and based on determining whether the application is the low latency application or the best effort application. The anchor point platform can designate the first network device as the designated network device to be the IP anchor point for the application when the application is the low latency application, or can designate the second network device as the designated network device to be the IP anchor point for the application when the application is the best effort application. The anchor point platform can provide, to the user device, information informing the user device that the designated network device is to be the IP anchor point for the application, and can provide, to the network, information instructing the network to utilize the designated network device as the IP anchor point for the application to permit the user device to utilize the designated network device as the IP anchor point for the application.

In this way, the anchor point platform can dynamically place network functions and/or functionalities (e.g., control plane functions and/or user plane functions) in network devices as needed (e.g., where needed and when needed). For example, if an application of a user device requires low latency for a particular time period (e.g., V2V communications), the anchor point platform can dynamically place control plane and/or user plane functions and/or functionalities in a network device that is located closer (e.g., geographically closer, closer in terms of network hops, and/or the like) to the application and the user device for the particular time period. After the particular time period ends, the anchor point platform can remove the dynamically placed control plane and/or user plane functions and/or functionalities from the network device.

FIGS. 1A-1H are diagrams of an example implementation 100 described herein. As shown in FIGS. 1A-1H, a user device (e.g., a 5G user device, a V2V user device, and/or the like) can be associated with an anchor point platform, a base station, and a network that includes an edge user plane function (UPF) (e.g., physically located near the base station), a default UPF (e.g., physically located remote from the base station), and a default SMF. As shown in FIG. 1A, the user device can be utilizing a first application that is a best effort application (e.g., not a low latency application), such as an Internet search engine application. As further shown in FIG. 1A, and by reference number 105, the anchor point platform can receive, from the user device, information indicating that the user device is utilizing the first application (e.g., a best effort application). In some implementations, the user device can include software (e.g., an application) that causes the user device to provide information indicating a type associated with the user device (e.g., a 5G user device, a 4G user device, and/or the like), information indicating an application currently being utilized by the user device, and/or the like to the anchor point platform. The anchor point platform can utilize such information to determine a user plane anchor point and/or a control plane anchor point for the user device.

As further shown in FIG. 1A, and by reference number 110, the anchor point platform can determine the default UPF to be a user plane (e.g., an IP) anchor point for the first application based on a set of rules and based on the first application being a best effort application. In some implementations, the default UPF can be selected by the anchor point platform since UPFs serve as anchor points for intra-aRAT and/or interRAT mobility and since the first application is a best effort application. In some implementations, the anchor point platform can determine whether the first application is a low latency application or a best effort application based on a maximum allowed latency for the first application (e.g., as defined by an operator of the anchor point platform, as provided by the network to the anchor point platform, and/or the like). In some implementations, a maximum allowed latency for a low latency application might be on the order of ten milliseconds, twenty milliseconds, and/or the like. A latency that is greater than the maximum allowed latency for a low latency application can be indicative of a best effort application. Assume for FIG. 1A that the anchor point platform determines that the first application is a best effort application based on the maximum allowed latency for the first application.

In some implementations, the anchor point platform can determine a network device to be the IP anchor point for the user device based on a type associated with the user device. For example, if the user device is a 5G user device, an augmented reality user device, a virtual reality user device, a V2V user device, and/or the like, the anchor point platform can determine a network device that is located closer (e.g., geographically closer, closer in terms of network hops, and/or the like) to the user device to be the IP anchor point for the user device since these types of user devices utilize low latency applications. Alternatively, if the user device is a 4G user device or is not a 5G user device, an augmented reality user device, a virtual reality user device, a V2V user device, and/or the like, the anchor point platform can determine a network device that is located further away (e.g., geographically further away, further away in terms of network hops, and/or the like) from the user device to be the IP anchor point for the user device since these types of user devices utilize best effort applications.

In some implementations, the anchor point platform can determine that a best effort application does not require an IP anchor point in a network device (e.g., the edge UPF) that is located closer (e.g., geographically closer, closer in terms of network hops, and/or the like) to the user device utilizing the best effort application since the best effort application does not require immediate response from the network device (e.g., there can be some latency associated with a response from the network device). For example, the set of rules can include a rule indicating that the best effort application does not require an IP anchor point in a network device that is located closer (e.g., geographically closer, closer in terms of network hops, and/or the like) to the user device utilizing the best effort application, a rule indicating that the best effort application requires an IP anchor point in a network device (e.g., the default UPF) that is located farther away (e.g., geographically father away, farther away in terms of network hops, and/or the like) from the user device utilizing the best effort application, and/or the like. Based on such rules, the anchor point platform can determine the default UPF to be the IP anchor point for the first application and the user device because the first application is a best effort application that does not require an IP anchor point in a network device that is located closer to the user device utilizing the best effort application, the first application is a best effort application that requires an IP anchor point in a network device (e.g., the default UPF) that is located farther away from the user device, and/or the like.

In some implementations, the anchor point platform can determine an anchor point for the user device based on a combination of criteria, such as a type of device associated with the user device, a type of application being utilized by the user device, network measurements for a particular time period, load conditions associated with network devices (e.g., edge UPFs), a quantity of edge UPFs relative to the user device, capabilities of the edge UPFs relative to the user device, and/or the like. In some implementations, the anchor point platform can determine an anchor point for the user device based on a weighted combination of the criteria. For example, the anchor point platform can determine scores for potential anchor points (e.g., multiple edge UPFs and/or multiple default UPFs) for the user device based on the weighted combination of the criteria, and can select the anchor point for the user device based on the scores.

Figure 1B:
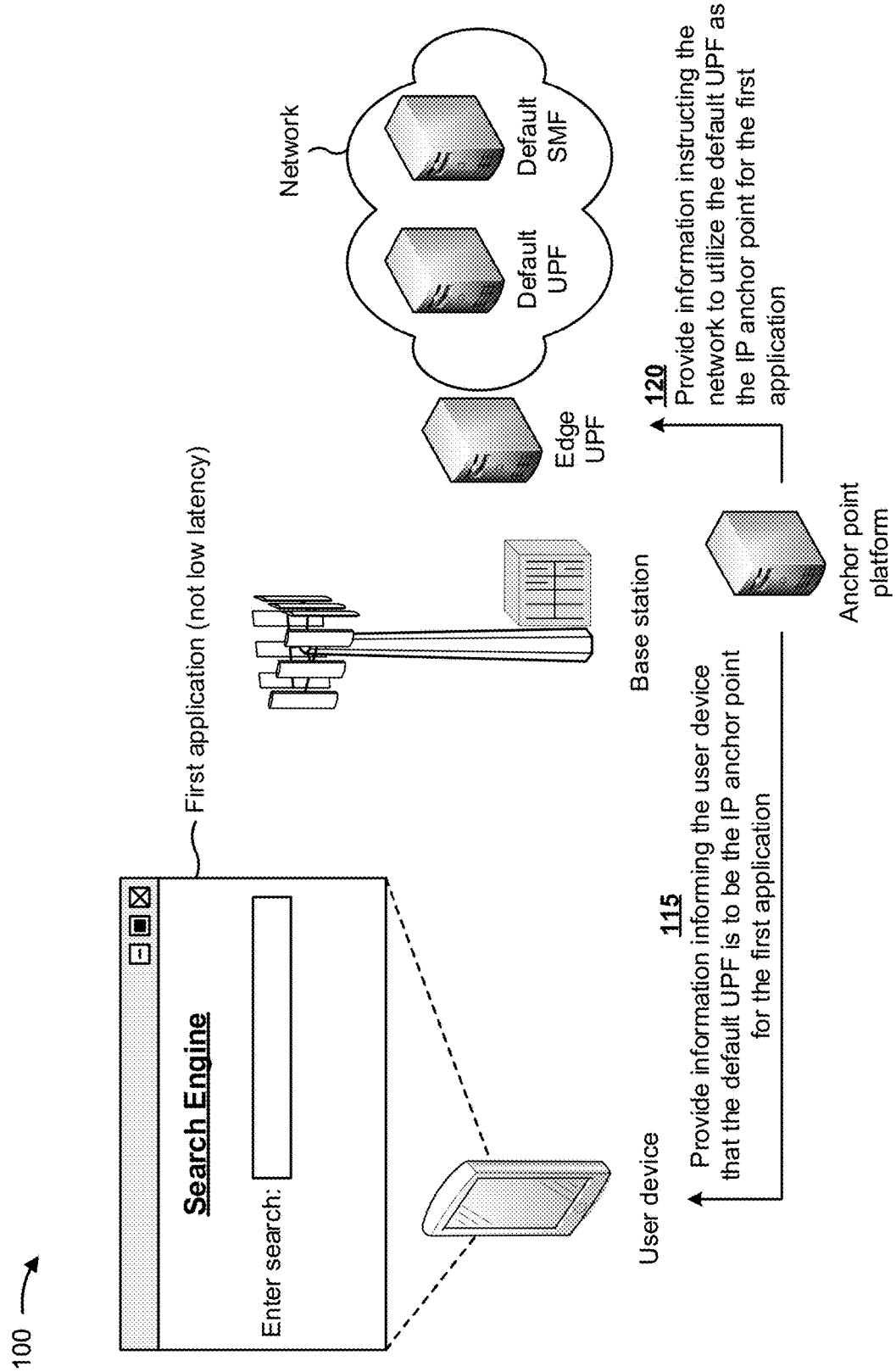

As shown in FIG. 1B, and by reference number 115, based on determining the default UPF to be the IP anchor point for the first application and the user device, the anchor point platform can provide, to the user device, information informing the user device that the default UPF is to be the IP anchor point for the first application. The user device can receive the information informing the user device that the default UPF is to be the IP anchor point for the first application, and can utilize the information to connect with the default UPF, as described below.

As further shown in FIG. 1B, and by reference number 120, based on determining the default UPF to be the IP anchor point for the first application and the user device, the anchor point platform can provide, to the network (e.g., a network slice selection function (NSSF), an access and mobility management function (AMF), a session management function (SMF), and/or the like of the network), information instructing the network to utilize the default UPF as the IP anchor point for the first application and the user device. The network can receive the information instructing the network to utilize the default UPF as the IP anchor point for the first application and the user device, and can utilize the information to cause the default UPF to establish a connection with the user device, as described below.

Figure 1C:
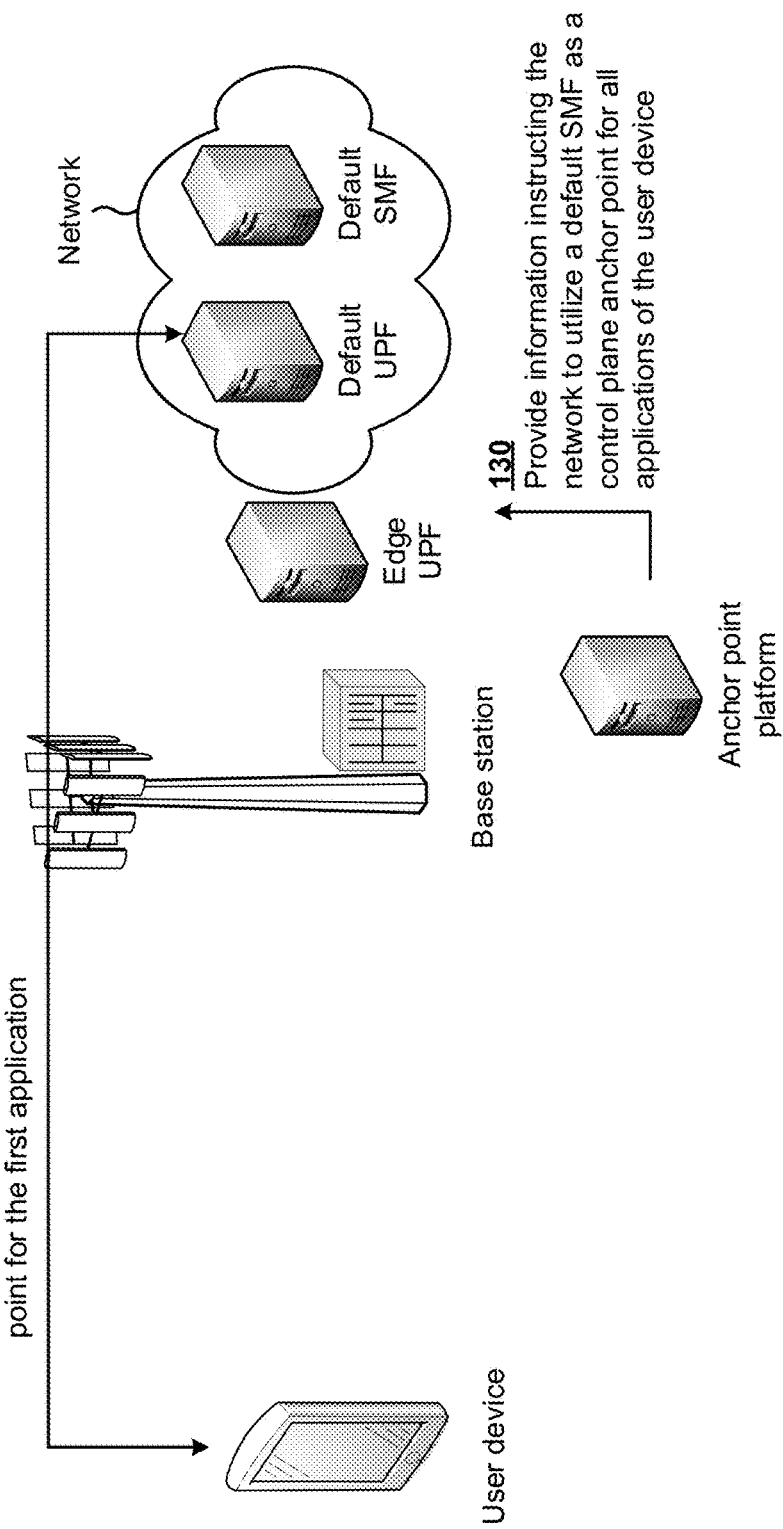

With reference to FIG. 1C, based on the information informing the user device that the default UPF is to be the IP anchor point for the first application and the information instructing the network to utilize the default UPF as the IP anchor point for the first application and the user device, the user device can establish a connection with the default UPF of the network. As further shown in FIG. 1C, and by reference number 125, the user device can utilize the default UPF as the IP anchor point for the first application based on establishing the connection with the default UPF.

As further shown in FIG. 1C, and by reference number 130, the anchor point platform can provide, to the network, information instructing the network to utilize the default SMF as a control plane anchor point for one or more applications utilized by the user device since the control plane anchor point can be a source of delay in the network. The network can receive the information instructing the network to utilize the default SMF as the control plane anchor point for one or more applications utilized by the user device, and can utilize the information to cause the default SMF to be the control plane anchor point for one or more applications utilized by the user device. In some implementations, a control plane anchor point cannot be a source of delay in the network and/or for an application of the user device, and the control plane anchor point can be provided in a network device that is located further away (e.g., geographically further away, further away in terms of network hops, and/or the like) from the user device. Thus, the anchor point platform can dedicate resources (e.g., processing resources, memory resources, and/or the like) of the default SMF for control plane functionality to serve the one or more applications utilized by the user device.

Figure 1D:
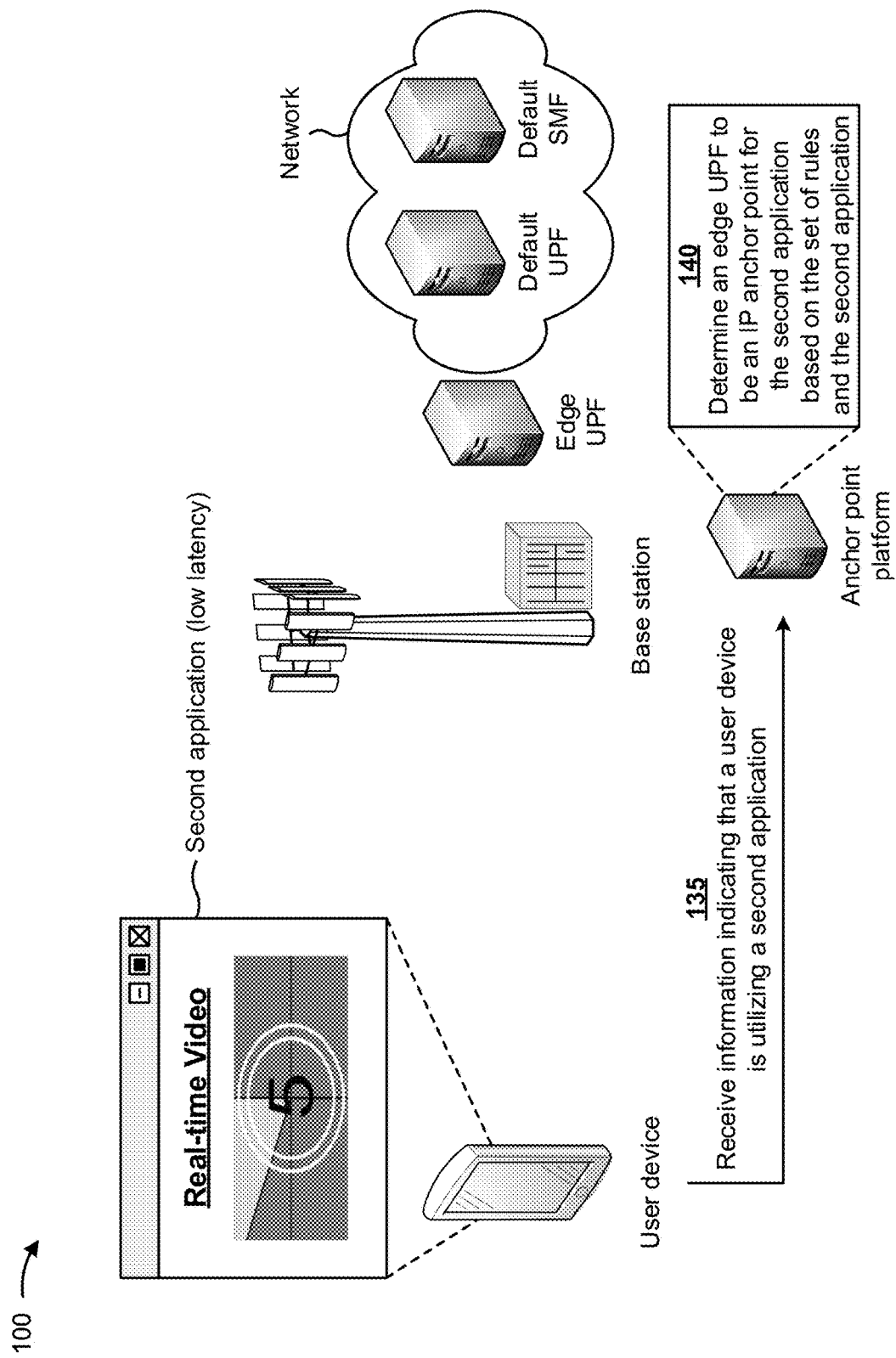

As shown in FIG. 1D, assume that the user device is utilizing a second application that is a low latency application, such as a real-time video application. As further shown in FIG. 1D, and by reference number 135, the anchor point platform can receive, from the user device, information indicating that the user device is utilizing the second application (e.g., a low latency application).

As further shown in FIG. 1D, and by reference number 140, the anchor point platform can determine the edge UPF to be an IP anchor point for the second application based on a set of rules and based on the second application being a low latency application. In some implementations, the anchor point platform can determine whether the second application is a low latency application or a best effort application based on a maximum allowed latency for the second application. In some implementations, as described above, a maximum allowed latency for a low latency application might be on the order of ten milliseconds, twenty milliseconds, and/or the like. A latency that is greater than the maximum allowed latency for a low latency application can be indicative of a best effort application. Assume for FIG. 1D that the anchor point platform determines that the second application is a low latency application based on the maximum allowed latency for the second application.

In some implementations, the anchor point platform can determine a network device to be the IP anchor point for the user device based on a type associated with the user device, as described above. For example, the anchor point platform can determine that the user device is a 5G user device, an augmented reality user device, a virtual reality user device, a V2V user device, and/or the like. Based on this determination, the anchor point platform can determine a network device (e.g., the edge UPF) that is located closer (e.g., geographically closer, closer in terms of network hops, and/or the like) to the user device to be the IP anchor point for the user device since the user device is a 5G user device, an augmented reality user device, a virtual reality user device, a V2V user device, and/or the like.

In some implementations, the anchor point platform can determine that a low latency application requires an IP anchor point in a network device (e.g., the edge UPF) that is located closer (e.g., geographically closer, closer in terms of network hops, and/or the like) to the user device utilizing the low latency application since the low latency application requires immediate response from the network device (e.g., there can be a latency associated with a response from the network device that satisfies the maximum allowed latency). For example, the set of rules can include a rule indicating that the IP anchor point is to be as close (e.g., geographically close, close in terms of network hops, and/or the like) to the user device as possible, a rule indicating that the IP anchor point is to include a threshold amount of processing resources and memory resources, a rule indicating that the IP anchor point is to be associated with a serving base station, a rule indicating a timing advance distance between the IP anchor point and the user device, a rule indicating an operational pathloss between the IP anchor point and the user device, and/or the like. Based on such rules, the anchor point platform can determine an edge UPF to be the IP anchor point for the second application and the user device. In some implementations, the anchor point platform can select the edge UPF, from multiple edge UPFs, based on one or more of the set of rules, as described below.

Figure 1E:
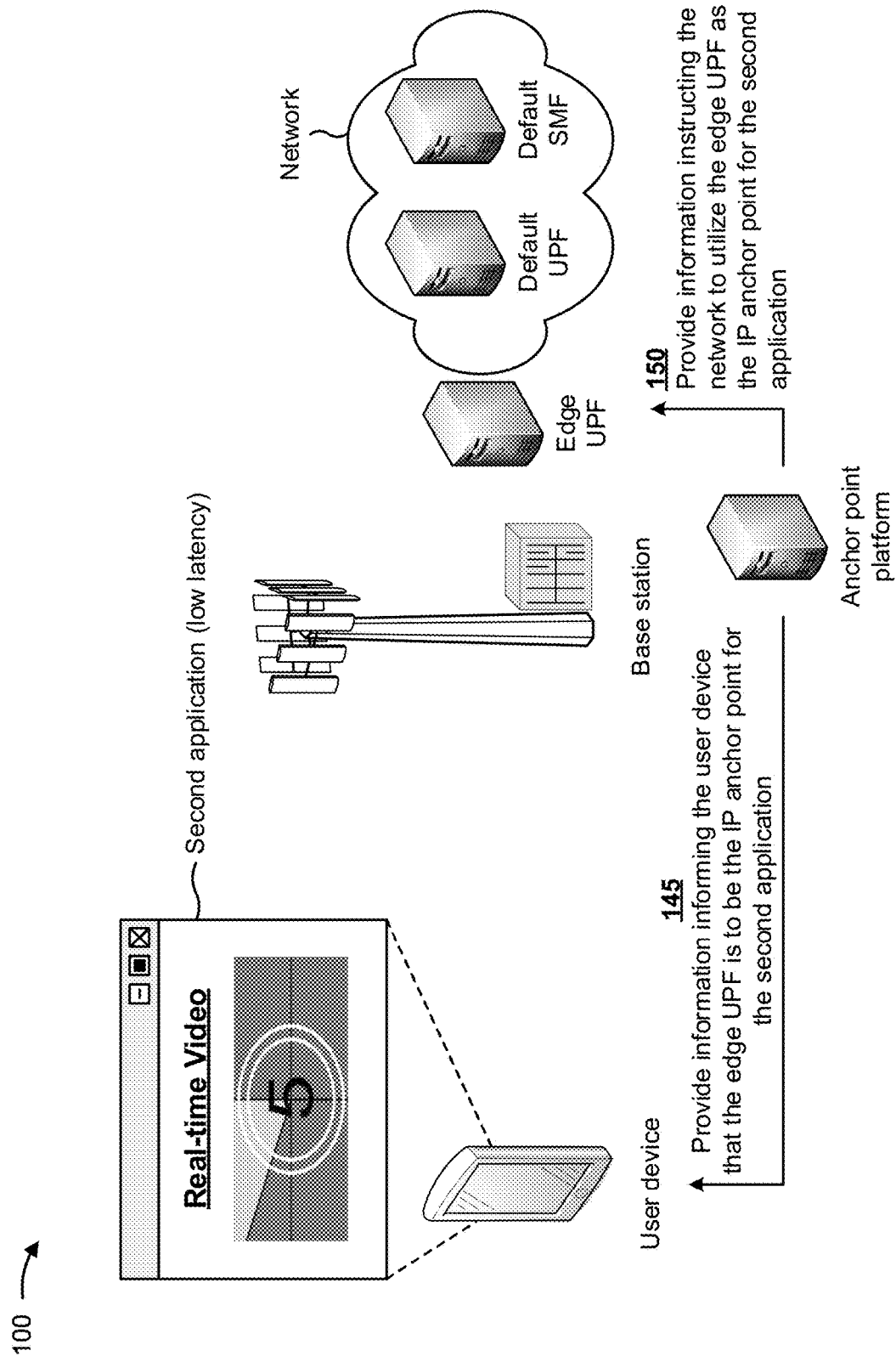

As shown in FIG. 1E, and by reference number 145, based on determining the edge UPF to be the IP anchor point for the second application and the user device, the anchor point platform can provide, to the user device, information informing the user device that the edge UPF is to be the IP anchor point for the second application. The user device can receive the information informing the user device that the edge UPF is to be the IP anchor point for the second application, and can utilize the information to connect with the edge UPF, as described below.

In some implementations, the user device can be utilizing multiple applications and the anchor point platform can determine different IP anchor points for each of the multiple applications. For example, if the user device is utilizing a low latency application and a best effort application, the anchor point platform can determine an edge UPF to be the IP anchor point for the low latency application, and can determine a default UPF to be the IP anchor point for the best effort application. In some implementations, the anchor point platform can determine a single IP anchor point for the multiple applications. In such implementations, if one of the multiple applications is a low latency application, the anchor point platform can determine an edge UPF to be the IP anchor point for the multiple applications. If the multiple application are best effort applications, the anchor point platform can determine a default UPF to be the IP anchor point for the multiple applications.

As further shown in FIG. 1E, and by reference number 150, based on determining the edge UPF to be the IP anchor point for the second application and the user device, the anchor point platform can provide, to the network, information instructing the network to utilize the edge UPF as the IP anchor point for the second application and the user device. The network can receive the information instructing the network to utilize the edge UPF as the IP anchor point for the second application and the user device, and can utilize the information to cause the edge UPF to establish a connection with the user device, as described below.

Figure 1F:
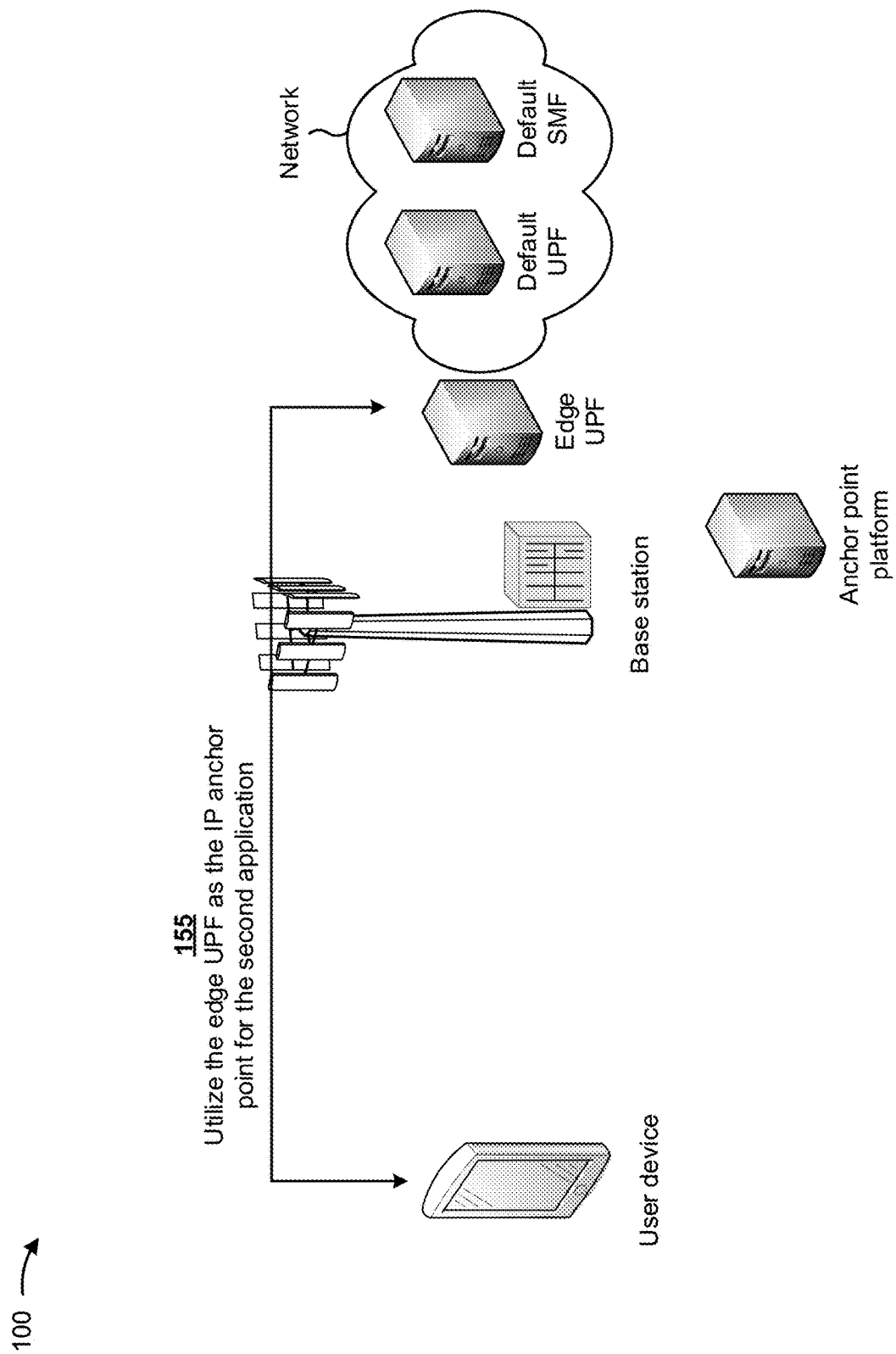

With reference to FIG. 1F, based on the information informing the user device that the edge UPF is to be the IP anchor point for the second application and the information instructing the network to utilize the edge UPF as the IP anchor point for the second application and the user device, the user device can establish a connection with the edge UPF of the network. As further shown in FIG. 1F, and by reference number 155, the user device can utilize the edge UPF as the IP anchor point for the second application based on establishing the connection with the edge UPF.

In some implementations, the anchor point platform can provide, to the network, information instructing the network to utilize the default SMF as a control plane anchor point for all applications (e.g., the second application) utilized by the user device, as described above. The network can receive the information instructing the network to utilize the default SMF as the control plane anchor point for the low latency application, and can utilize the information to cause the default SMF to be the control plane anchor point for the second application.

In some implementations, the network can include multiple edge UPFs from which the anchor point platform can select to be the IP anchor point for a low latency application utilized by the user device. In such implementations, and as shown by reference number 160 in FIG. 1G, the anchor point platform can receive user device information, application information, network information, and/or the like. The user device information can include information indicating that the user device is a 5G user device, an augmented reality user device, a virtual reality user device, a V2V user device, and/or the like. The application information can include information indicating that an application utilized by the user device is a low latency application. The network information can include information associated with the multiple edge UPFs from which the anchor point platform can select to be the IP anchor point for a low latency application utilized by the user device, such as loads associated with the multiple edge UPFs, geographical distances between the user device and the multiple edge UPFs, information indicating next hops between the multiple edge UPFs and the user, and/or the like.

As further shown in FIG. 1G, and reference number 165, the anchor point platform can apply weights to the set of rules based on the user device information, the application information, the network information, and/or the like. In some implementations, the set of rules can include a rule (R1) indicating that the IP anchor point is to be as close (e.g., geographically close, close in terms of network hops, and/or the like) to the user device as possible, a rule (R2) indicating that the IP anchor point is to include a threshold amount of processing resources and memory resources, a rule (R3) indicating that the IP anchor point is to be associated with a serving base station, a rule (R4) indicating a timing advance distance between the IP anchor point and the user device, a rule (R5) indicating an operational pathloss between the IP anchor point and the user device, and/or the like. In some implementations, the anchor point platform can apply different weights to different rules based on the user device information, the application information, the network information, and/or the like. For example, the anchor point platform can apply a greater weight to rule R1 than the other rules since rule R1 can ensure that the IP anchor point is an edge UPF that is located closest (e.g., geographically closest, closest in terms of network hops, and/or the like) to the user device and the low latency application. In another example, the anchor point platform can apply a greater weight to rule R2 than rules R3-R5 since rule R2 can ensure that the IP anchor point is an edge UPF with sufficient resources (e.g., processing resources, memory resources, and/or the like) to handle the low latency application.

As further shown in FIG. 1G, and by reference number 170, the anchor point platform can determine scores for the multiple edge UPFs based on the weighted set of rules. In some implementations, the multiple edge UPFs can include edge UPF 1, edge UPF 2, . . . , and edge UPF N (where N≥2) and the anchor point platform can determine a score of 0.75 for edge UPF 1, a score of 0.9 for edge UPF 2, . . . , and a score of 0.8 for edge UPF N based on the weighted set of rules.

Figure 1H:
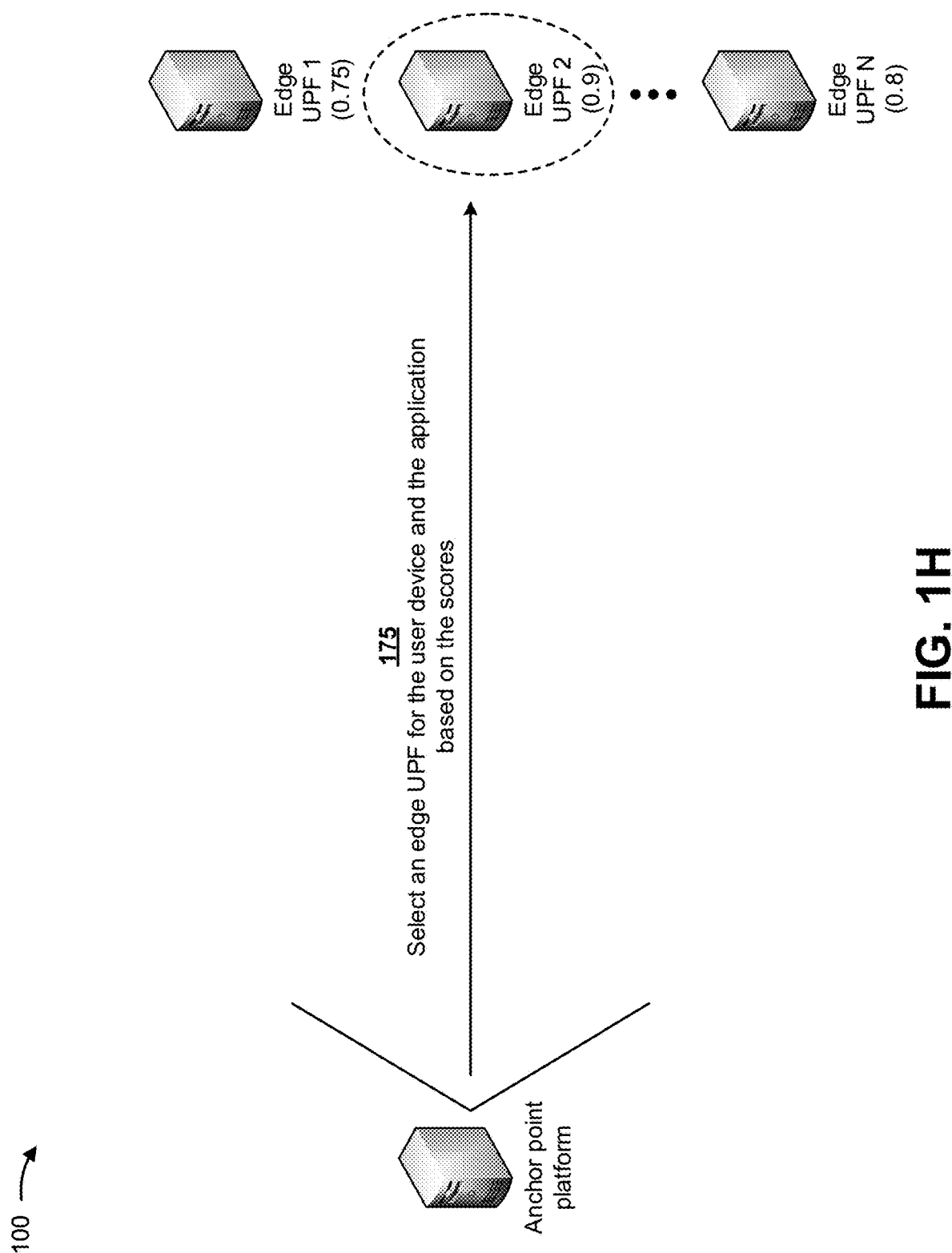

As shown in FIG. 1H, and by reference number 175, the anchor point platform can select an edge UPF, from the multiple edge UPFs and for the user device and the low latency application, based on the determined scores for the multiple edge UPFs. For example, as shown in FIG. 1H, since edge UPF 2 has a score (e.g., 0.9) that is greater than scores (e.g., 0.75 and 0.8) of edge UPF 1 and edge UPF N, respectively, the anchor point platform can select edge UPF 2 as the IP anchor point for the low latency application utilized by the user device.

In some implementations, based on selecting edge UPF 2 to be the IP anchor point for the low latency application and the user device, the anchor point platform can provide, to the user device, information informing the user device that edge UPF 2 is to be the IP anchor point for the low latency application. The user device can receive the information informing the user device that edge UPF 2 is to be the IP anchor point for the low latency application, and can utilize the information to connect with edge UPF 2, as described below.

In some implementations, based on selecting edge UPF 2 to be the IP anchor point for the low latency application and the user device, the anchor point platform can provide, to the network, information instructing the network to utilize edge UPF 2 as the IP anchor point for the low latency application and the user device. The network can receive the information instructing the network to utilize edge UPF 2 as the IP anchor point for the low latency application and the user device, and can utilize the information to cause edge UPF 2 to establish a connection with the user device, as described below.

In some implementations, based on the information informing the user device that edge UPF 2 is to be the IP anchor point for the low latency application and the information instructing the network to utilize edge UPF 2 as the IP anchor point for the low latency application and the user device, the user device can establish a connection with edge UPF 2 of the network. In such implementations, the user device can utilize edge UPF 2 as the IP anchor point for the low latency application based on establishing the connection with edge UPF 2.

In this way, several different stages of the process for dynamically placing an IP anchor point based on a user device and/or an application are automated, which can remove human subjectivity and waste from the process, and which can improve speed and efficiency of the process and conserve computing resources (e.g., processing resources, memory resources, and/or the like). Furthermore, implementations described herein use a rigorous, computerized process to perform tasks or roles that were not previously performed or were previously performed using subjective human intuition or input. For example, currently there does not exist a technique that dynamically places an IP anchor point based on a user device and/or an application. Finally, automating the process for dynamically placing an IP anchor point based on a user device and/or an application conserves computing resources (e.g., processing resources, memory resources, and/or the like) that would otherwise be wasted in attempting to place an IP anchor point based on a user device and/or an application.

As indicated above, FIGS. 1A-1H are provided merely as examples. Other examples are possible and can differ from what was described with regard to FIGS. 1A-1H. The number and arrangement of devices and networks shown in FIGS. 1A-1H are provided as an example. In practice, there can be additional devices and/or networks, fewer devices and/or networks, different devices and/or networks, or differently arranged devices and/or networks than those shown in FIGS. 1A-1H. Furthermore, two or more devices shown in FIGS. 1A-1H can be implemented within a single device, or a single device shown in FIGS. 1A-1H can be implemented as multiple, distributed devices. Additionally, or alternatively, a set of devices (e.g., one or more devices) of FIGS. 1A-1H can perform one or more functions described as being performed by another set of devices of FIGS. 1A-1H.

Figure 2:
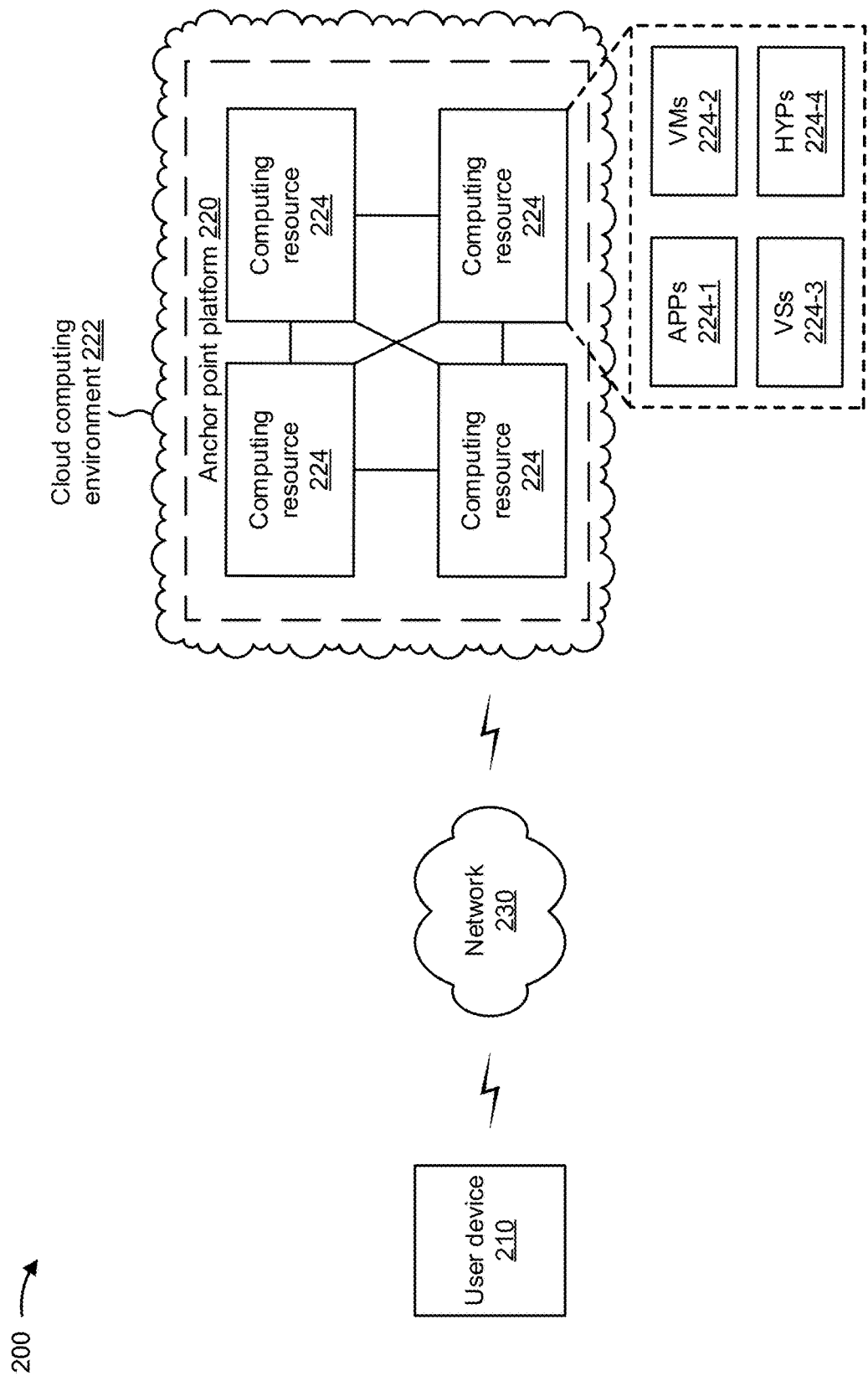
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include a user device 210, an anchor point platform 220, and a network 230. Devices of environment 200 can interconnect via wired connections, wireless connections, or a combination of wired and wireless connections.

User device 210 includes one or more devices capable of receiving, generating, storing, processing, and/or providing information, such as information described herein. For example, user device 210 can include a mobile phone (e.g., a smart phone, a radiotelephone, etc.), a laptop computer, a tablet computer, a desktop computer, a handheld computer, a gaming device, a wearable communication device (e.g., a smart watch, a pair of smart glasses, etc.), a mobile hotspot device, a fixed wireless access device, customer premises equipment, or a similar type of device. In some implementations, user device 210 can receive information from and/or transmit information to anchor point platform 220 and/or network 230.

Anchor point platform 220 includes one or more devices that dynamically place an IP anchor point based on a user device and/or an application. In some implementations, anchor point platform 220 can be designed to be modular such that certain software components can be swapped in or out depending on a particular need. As such, anchor point platform 220 can be easily and/or quickly reconfigured for different uses. In some implementations, anchor point platform 220 can receive information from and/or transmit information to one or more user devices 210.

In some implementations, as shown, anchor point platform 220 can be hosted in a cloud computing environment 222. Notably, while implementations described herein describe anchor point platform 220 as being hosted in cloud computing environment 222, in some implementations, anchor point platform 220 cannot be cloud-based (i.e., can be implemented outside of a cloud computing environment) or can be partially cloud-based.

Cloud computing environment 222 includes an environment that hosts anchor point platform 220. Cloud computing environment 222 can provide computation, software, data access, storage, etc. services that do not require end-user knowledge of a physical location and configuration of system(s) and/or device(s) that hosts anchor point platform 220. As shown, cloud computing environment 222 can include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 can host anchor point platform 220. The cloud resources can include compute instances executing in computing resource 224, storage devices provided in computing resource 224, data transfer devices provided by computing resource 224, etc. In some implementations, computing resource 224 can communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that can be provided to or accessed by user device 210. Application 224-1 can eliminate a need to install and execute the software applications on user device 210. For example, application 224-1 can include software associated with anchor point platform 220 and/or any other software capable of being provided via cloud computing environment 222. In some implementations, one application 224-1 can send/receive information to/from one or more other applications 224-1, via virtual machine 224-2.

Virtual machine 224-2 includes a software implementation of a machine (e.g., a computer) that executes programs like a physical machine. Virtual machine 224-2 can be either a system virtual machine or a process virtual machine, depending upon use and degree of correspondence to any real machine by virtual machine 224-2. A system virtual machine can provide a complete system platform that supports execution of a complete operating system ("OS"). A process virtual machine can execute a single program, and can support a single process. In some implementations, virtual machine 224-2 can execute on behalf of a user (e.g., a user of user device 210 or an operator of anchor point platform 220), and can manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 224-4 can provide hardware virtualization techniques that allow multiple operating systems (e.g., "guest operating systems") to execute concurrently on a host computer, such as computing resource 224. Hypervisor 224-4 can present a virtual operating platform to the guest operating systems, and can manage the execution of the guest operating systems. Multiple instances of a variety of operating systems can share virtualized hardware resources.

Network 230 includes one or more wired and/or wireless networks. For example, network 230 can include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
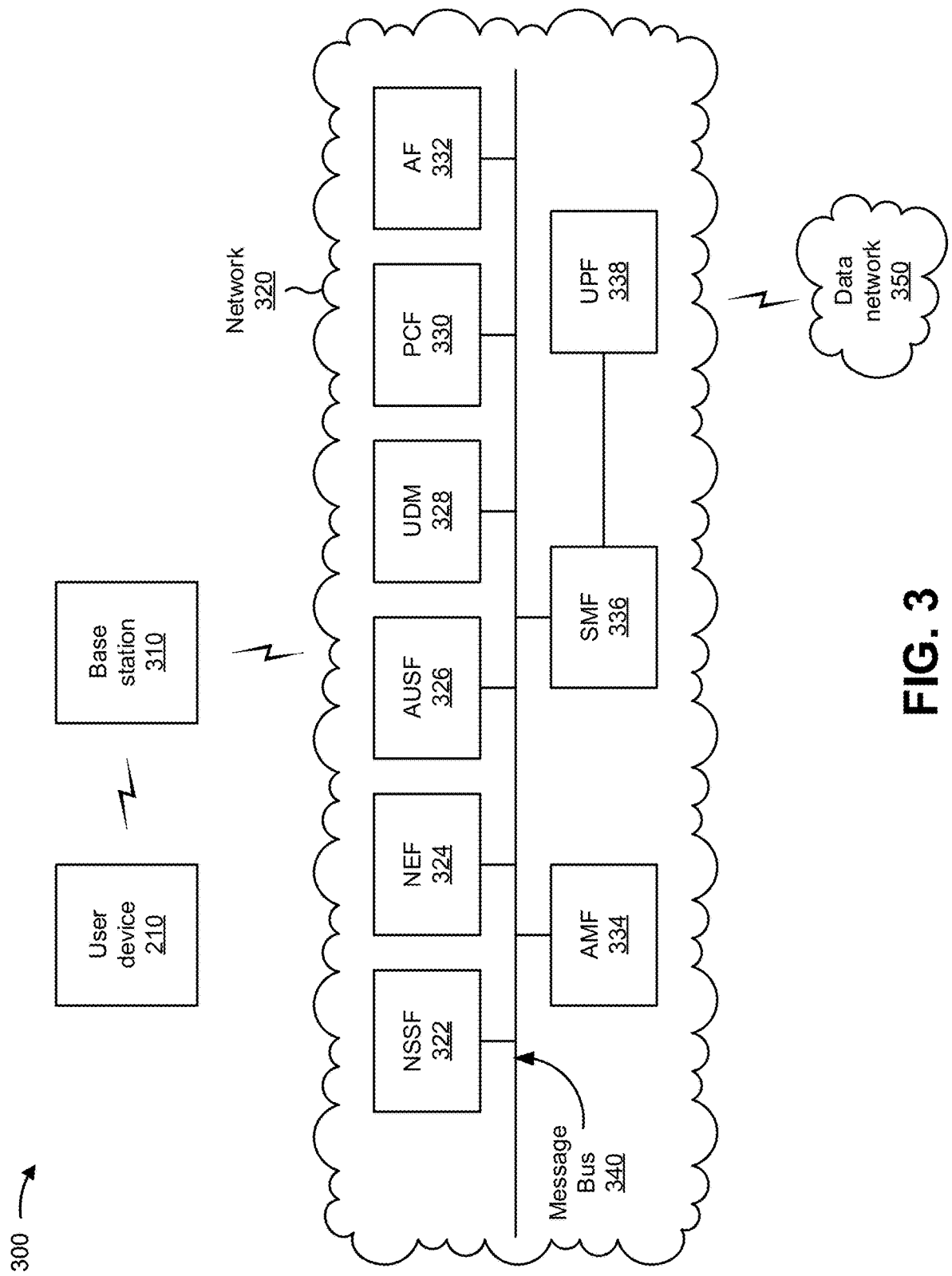
FIG. 3 is a diagram of an example network environment of the example environment shown in FIG. 2.

FIG. 3 is a diagram of an example network environment 300 of example environment 200 shown in FIG. 2. As shown in FIG. 3, example network environment 300 can include user device 210, a base station 310, a network 320, and a data network 350. In some implementations, network 320 and data network 350 can correspond to network 230 of FIG. 2. Devices and/or networks of example network environment 300 can interconnect via wired connections, wireless connections, or a combination of wired and wireless connections.

In some implementations, network 320 can include an example functional architecture in which systems and/or methods, described herein, can be implemented. For example, network 320 can include an example architecture of a 5G next generation (NG) core network included in a 5G wireless telecommunications system. While the example architecture of network 320 shown in FIG. 3 can be an example of a service-based architecture, in some implementations, network 320 can be implemented as a reference-point architecture.

As shown in FIG. 3, network 320 can include a number of functional elements. The functional elements can include, for example, a network slice selection function (NSSF) 322, a network exposure function (NEF) 324, an authentication server function (AUSF) 326, a unified data management (UDM) component 328, a policy control function (PCF) 330, an application function (AF) 332, an access and mobility management function (AMF) 334, a session management function (SMF) 336, a user plane function (UPF) 338, and/or the like. These functional elements can be communicatively connected via a message bus 340. Each of the functional elements shown in FIG. 3 is implemented on one or more devices associated with a wireless telecommunications system. In some implementations, one or more of the functional elements can be implemented on physical devices, such as an access point, a base station, a gateway, and/or the like. In some implementations, one or more of the functional elements can be implemented on a computing device of a cloud computing environment.

Base station 310 includes one or more devices capable of communicating with user device 210 using a cellular radio access technology (RAT). For example, base station 310 can include a base transceiver station, a radio base station, a node B, an eNodeB (eNB), a gNodeB (gNB), a base station subsystem, a cellular site, a cellular tower (e.g., a cell phone tower, a mobile phone tower, and/or the like), an access point, a transmit receive point (TRP), a radio access node, a macrocell base station, a microcell base station, a picocell base station, a femtocell base station, or a similar type of device. Base station 310 can transfer traffic between user device 210 (e.g., using a cellular RAT), other base stations 310 (e.g., using a wireless interface or a backhaul interface, such as a wired backhaul interface), and/or network 320. Base station 310 can provide one or more cells that cover geographic areas. Some base stations 310 can be mobile base stations. Some base stations 310 can communicate using multiple RATs.

In some implementations, base station 310 can perform scheduling and/or resource management for user devices 210 covered by base station 310 (e.g., user devices 210 covered by a cell provided by base station 310). In some implementations, base stations 310 can be controlled or coordinated by a network controller, which can perform load balancing, network-level configuration, and/or the like. The network controller can communicate with base stations 310 via a wireless or wireline backhaul. In some implementations, base station 310 can include a network controller, a self-organizing network (SON) module or component, or a similar module or component. In other words, base station 310 can perform network control, scheduling, and/or network management functions (e.g., for other base stations 310 and/or for uplink, downlink, and/or sidelink communications of user devices 210 covered by the base station 310). In some implementations, base station 310 can include a central unit and multiple distributed units. The central unit can coordinate access control and communication with regard to the multiple distributed units. The multiple distributed units can provide user devices 210 and/or other base stations 310 with access to data network 340 via core network 330.

NSSF 322 includes one or more devices that select network slice instances for user device 210. By providing network slicing, NSSF 322 allows an operator to deploy multiple substantially independent end-to-end networks potentially with the same infrastructure. In some implementations, each slice can be customized for different services.

NEF 324 includes one or more devices that support exposure of capabilities and/or events in the wireless telecommunications system to help other entities in the wireless telecommunications system discover network services.

AUSF 326 includes one or more devices that act as an authentication server and support the process of authenticating user devices 210 in the wireless telecommunications system.

UDM 328 includes one or more devices that store subscriber data and profiles in the wireless telecommunications system. UDM 328 can be used for fixed access, mobile access, and/or the like, in network 320.

PCF 330 includes one or more devices that provide a policy framework that incorporates network slicing, roaming, packet processing, mobility management, and/or the like.

AF 332 includes one or more devices that support application influence on traffic routing, access to NEF 324, policy control, and/or the like.

AMF 334 includes one or more devices that act as a termination point for non-access stratum (NAS) signaling, mobility management, and/or the like.

SMF 336 includes one or more devices that support the establishment, modification, and release of communications sessions in the wireless telecommunications system. For example, SMF 336 can configure traffic steering policies at UPF 338, enforce user device IP address allocation and policies, and/or the like.

UPF 338 includes one or more devices that serve as an anchor point for intraRAT and/or interRAT mobility. UPF 338 can apply rules to packets, such as rules pertaining to packet routing, traffic reporting, handling user plane QoS, and/or the like.

Message bus 340 represents a communication structure for communication among the functional elements. In other words, message bus 340 can permit communication between two or more functional elements.

Data network 350 includes one or more wired and/or wireless data networks. For example, data network 350 can include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or the like, and/or a combination of these or other types of networks.

The number and arrangement of devices and networks shown in FIG. 3 are provided as an example. In practice, there can be additional devices and/or networks, fewer devices and/or networks, different devices and/or networks, or differently arranged devices and/or networks than those shown in FIG. 3. Furthermore, two or more devices shown in FIG. 3 can be implemented within a single device, or a single device shown in FIG. 3 can be implemented as multiple, distributed devices. Additionally, or alternatively, a set of devices (e.g., one or more devices) of network environment 300 can perform one or more functions described as being performed by another set of devices of network environment 300.

Figure 4:
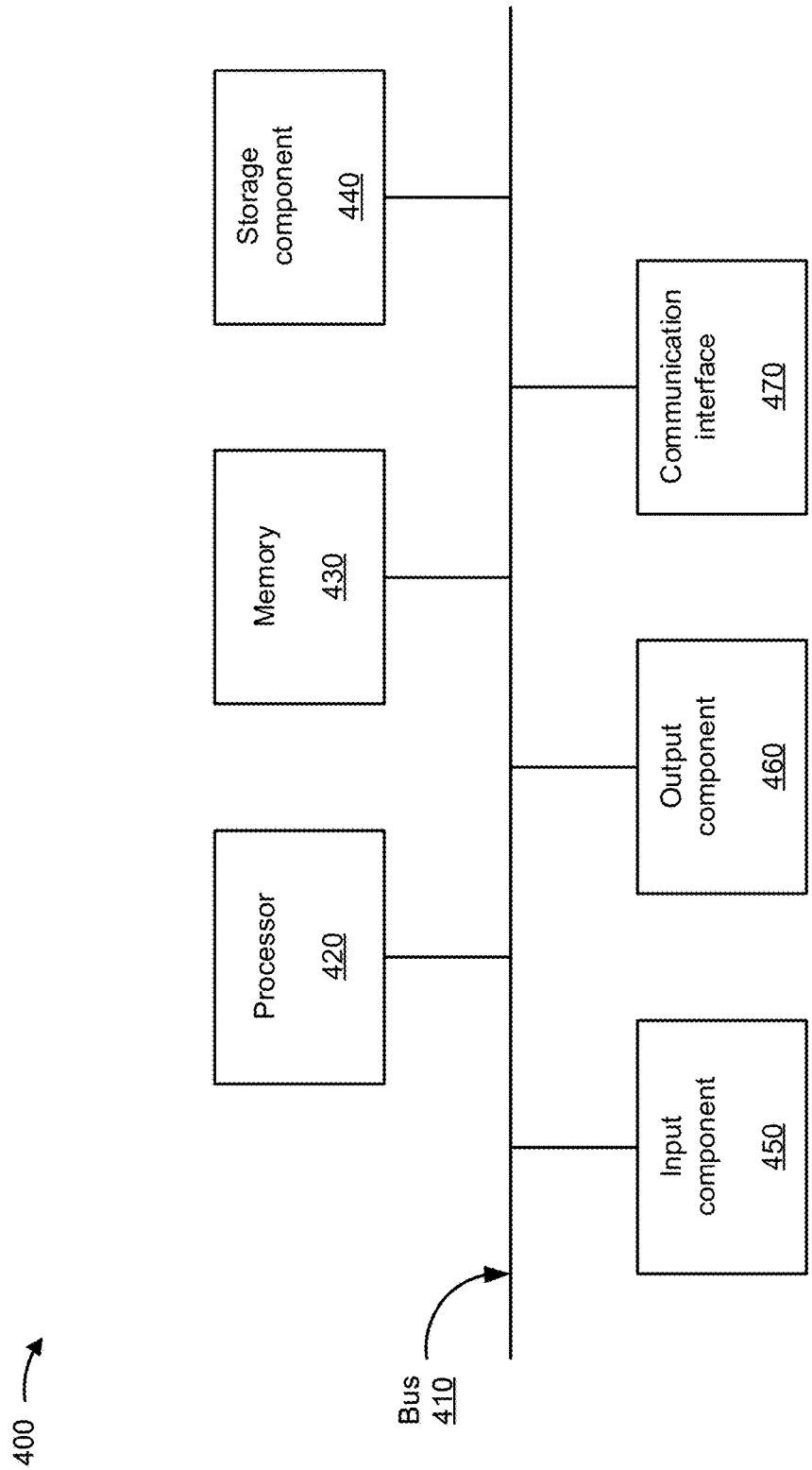
FIG. 4 is a diagram of example components of one or more devices of FIGS. 2 and 3.

FIG. 4 is a diagram of example components of a device 400. Device 400 can correspond to user device 210, computing resource 224, base station 310, NSSF 322, NEF 324, AUSF 326, UDM 328, PCF 330, AF 332, AMF 334, SMF 336, and/or UPF 338. In some implementations, user device 210, computing resource 224, base station 310, NSSF 322, NEF 324, AUSF 326, UDM 328, PCF 330, AF 332, AMF 334, SMF 336, and/or UPF 338 can include one or more devices 400 and/or one or more components of device 400. As shown in FIG. 4, device 400 can include a bus 410, a processor 420, a memory 430, a storage component 440, an input component 450, an output component 460, and a communication interface 470.

Bus 410 includes a component that permits communication among the components of device 400. Processor 420 is implemented in hardware, firmware, or a combination of hardware and software. Processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 can include a sensor for sensing information (e.g., a global positioning system (GPS) component, an accelerometer, a gyroscope, and/or an actuator). Output component 460 includes a component that provides output information from device 400 (e.g., a display, a speaker, and/or one or more light-emitting diodes (LEDs)).

Communication interface 470 includes a transceiver-like component (e.g., a transceiver and/or a separate receiver and transmitter) that enables device 400 to communicate with other devices, such as via a wired connection, a wireless connection, or a combination of wired and wireless connections. Communication interface 470 can permit device 400 to receive information from another device and/or provide information to another device. For example, communication interface 470 can include an Ethernet interface, an optical interface, a coaxial interface, an infrared interface, a radio frequency (RF) interface, a universal serial bus (USB) interface, a Wi-Fi interface, a cellular network interface, and/or the like.

Device 400 can perform one or more processes described herein. Device 400 can perform these processes based on processor 420 executing software instructions stored by a non-transitory computer-readable medium, such as memory 430 and/or storage component 440. A computer-readable medium is defined herein as a non-transitory memory device. A memory device includes memory space within a single physical storage device or memory space spread across multiple physical storage devices.

Software instructions can be read into memory 430 and/or storage component 440 from another computer-readable medium or from another device via communication interface 470. When executed, software instructions stored in memory 430 and/or storage component 440 can cause processor 420 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 can include additional components, fewer components, different components, or differently arranged components than those shown in FIG. 4. Additionally, or alternatively, a set of components (e.g., one or more components) of device 400 can perform one or more functions described as being performed by another set of components of device 400. In some implementations, the set of components can be virtualized on general purpose hardware and/or a cloud computing environment.

Figure 5:
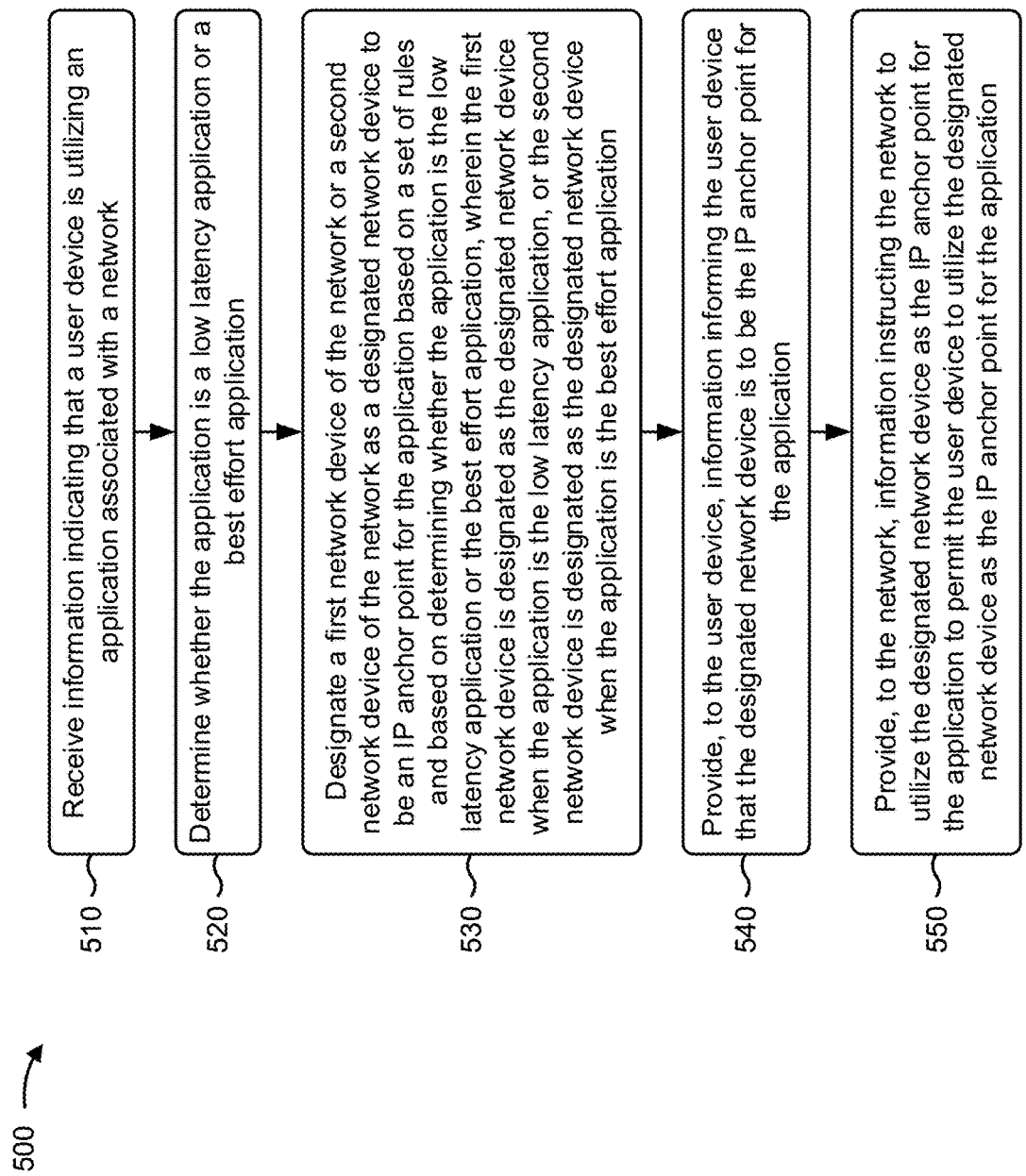
FIG. 5 is a flow chart of an example process for dynamically placing an Internet protocol (IP) anchor point based on a user device and/or an application.

FIG. 5 is a flow chart of an example process 500 for dynamically placing an IP anchor point based on a user device and/or an application. In some implementations, one or more process blocks of FIG. 5 can be performed by an anchor point platform (e.g., anchor point platform 220). In some implementations, one or more process blocks of FIG. 5 can be performed by another device or a group of devices separate from or including the anchor point platform, such as a base station (e.g., base station 310), a NSSF (e.g., NSSF 322), a SMF (e.g., SMF 336), and/or a UPF (e.g., UPF 338).

As shown in FIG. 5, process 500 can include receiving information indicating that a user device is utilizing an application associated with a network (block 510). For example, the anchor point platform (e.g., using computing resource 224, processor 420, communication interface 470, and/or the like) can receive information indicating that a user device is utilizing an application associated with a network, as described above in connection with FIGS. 1A-3.

As further shown in FIG. 5, process 500 can include determining whether the application is a low latency application or a best effort application (block 520). For example, the anchor point platform (e.g., using computing resource 224, processor 420, memory 430, and/or the like) can determine whether the application is a low latency application or a best effort application, as described above in connection with FIGS. 1A-3.

As further shown in FIG. 5, process 500 can include designating a first network device of the network or a second network device of the network as a designated network device to be an Internet protocol (IP) anchor point for the application based on a set of rules and based on determining whether the application is the low latency application or the best effort application, wherein the first network device is designated as the designated network device to be the IP anchor point for the application when the application is the low latency application, or wherein the second network device is designated as the designated network device to be the IP anchor point for the application when the application is the best effort application (block 530). For example, the anchor point platform (e.g., using computing resource 224, processor 420, storage component 440, and/or the like) can designate a first network device of the network or a second network device of the network as a designated network device to be an Internet protocol (IP) anchor point for the application based on a set of rules and based on determining whether the application is the low latency application or the best effort application, as described above in connection with FIGS. 1A-3. In some implementations, the first network device can be designated as the designated network device to be the IP anchor point for the application when the application is the low latency application, or the second network device can be designated as the designated network device to be the IP anchor point for the application when the application is the best effort application.

As further shown in FIG. 5, process 500 can include providing, to the user device, information informing the user device that the designated network device is to be the IP anchor point for the application (block 540). For example, the anchor point platform (e.g., using computing resource 224, processor 420, memory 430, communication interface 470, and/or the like) can provide, to the user device, information informing the user device that the designated network device is to be the IP anchor point for the application, as described above in connection with FIGS. 1A-3.

As further shown in FIG. 5, process 500 can include providing, to the network, information instructing the network to utilize the designated network device as the IP anchor point for the application to permit the user device to utilize the designated network device as the IP anchor point for the application (block 550). For example, the anchor point platform (e.g., using computing resource 224, processor 420, storage component 440, communication interface 470, and/or the like) can provide, to the network, information instructing the network to utilize the designated network device as the IP anchor point for the application to permit the user device to utilize the designated network device as the IP anchor point for the application, as described above in connection with FIGS. 1A-3.

Process 500 can include additional implementations, such as any single implementation or any combination of implementations described below and/or described with regard to any other process described herein.

In some implementations, the anchor point platform can provide, to the network, information instructing the network to utilize a third network device of the network as a control plane anchor point for the application of the user device. In some implementations, when designating the first network device as the designated network device, the anchor point platform can apply weights to the set of rules, based on the application being the low latency application and based on information associated with a plurality of first network devices, to generate a weighted set of rules, wherein the first network device is included in the plurality of first network devices, can determine scores for the plurality of first network devices based on the weighted set of rules, and can select the first network device, from the plurality of first network devices, based on the scores.

In some implementations, the first network device can be a user plane function (UPF) device provided at an edge of the network, and the second network device can be a UPF device provided at a central location of the network. In some implementations, the low latency application can include an autonomous driving application, a real-time vehicle-to-vehicle (V2V) communication application, and/or an application that delivers video, and the best effort application can include an application to enable a web download, and/or an application to access the Internet.

In some implementations, the anchor point platform can receive, from the user device, information indicating that the user stopped utilizing the application, and can provide, to the network, information instructing the network to stop utilizing the designated network device as the IP anchor point for the application. In some implementations, the set of rules can include a rule indicating that the IP anchor point is to be as close (e.g., geographically close, close in terms of network hops, and/or the like) to the user device as possible, a rule indicating that the IP anchor point is to include a threshold amount of processing resources and memory resources, a rule indicating that the IP anchor point is to be associated with a serving base station, a rule indicating a timing advance distance between the IP anchor point and the user device, and/or a rule indicating an operational pathloss between the IP anchor point and the user device.

Although FIG. 5 shows example blocks of process 500, in some implementations, process 500 can include additional blocks, fewer blocks, different blocks, or differently arranged blocks than those depicted in FIG. 5. Additionally, or alternatively, two or more of the blocks of process 500 can be performed in parallel.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, to:
  receive information indicating that a user device is utilizing an application associated with a network;
  determine whether the application is a low latency application or a best effort application;
  designate a first network device of the network or a second network device of the network as a designated network device to be an Internet protocol (IP) anchor point for the application based on a set of rules and based on determining whether the application is the low latency application or the best effort application,
    wherein the first network device is designated as the designated network device to be the IP anchor point for the application when the application is the low latency application, or
    wherein the second network device is designated as the designated network device to be the IP anchor point for the application when the application is the best effort application,
    wherein the set of rules includes two one or more of:
      a rule indicating that the IP anchor point is to be as close to the user device as possible,
      a rule indicating that the IP anchor point is to include a threshold amount of processing resources and memory resources,
      a rule indicating that the IP anchor point is to be associated with a serving base station,
      a rule indicating a timing advance distance between the IP anchor point and the user device, or
      a rule indicating an operational pathloss between the IP anchor point and the user device, and
    the one or more processors, when designating the first network device as the designated network device, are to:
      apply a weight to each rule, of the set of rules, to generate a weighted set of rules,
      determine scores for a plurality of first network devices based on the weighted set of rules, and
      select the first network device, from the plurality of first network devices, based on a score for the first network device being greater than scores associated with one or more other network devices from the scores for the plurality of first network devices;
  provide, to the user device, information informing the user device that the designated network device is to be the IP anchor point for the application; and
  provide, to the network, information instructing the network to utilize the designated network device as the IP anchor point for the application to permit the user device to utilize the designated network device as the IP anchor point for the application.

2. The device of claim 1, wherein the one or more processors are further to:
  provide, to the network, information instructing the network to utilize a third network device of the network as a control plane anchor point for the application of the user device.

3. The device of claim 1, wherein:
  the first network device is a user plane function (UPF) device provided at an edge of the network, and
  the second network device is a UPF device provided at a central location of the network.

4. The device of claim 1, wherein:
  the low latency application includes one or more of:
    an autonomous driving application,
    a real-time vehicle-to-vehicle (V2V) communication application, or
    an application that delivers video; and
  the best effort application includes one or more of:
    an application to enable a web download, or
    an application to access the Internet.

5. The device of claim 1, wherein the one or more processors are further to:
  receive, from the user device, information indicating that a user stopped utilizing the application; and
  provide, to the network, information instructing the network to stop utilizing the designated network device as the IP anchor point for the application.

6. A non-transitory computer-readable medium storing instructions, the instructions comprising:
  one or more instructions that, when executed by one or more processors of a device, cause the one or more processors to:
    receive information indicating that a user device is utilizing an application associated with a network;
    determine whether the application is a low latency application or a best effort application;
    designate a first network device of the network or a second network device of the network as a designated network device to be an Internet protocol (IP) anchor point for the application based on a set of rules and based on determining whether the application is the low latency application or the best effort application,
      the first network device being designated as the designated network device to be the IP anchor point for the application when the application is the low latency application, or
      the second network device being designated as the designated network device to be the IP anchor point for the application when the application is the best effort application,
      wherein the set of rules includes two one or more of:
        a rule indicating that the IP anchor point is to be as close to the user device as possible, a rule indicating that the IP anchor point is to include a threshold amount of processing resources and memory resources,
a rule indicating that the IP anchor point is to be associated with a serving base station,
a rule indicating a timing advance distance between the IP anchor point and the user device, or
a rule indicating an operational pathloss between the IP anchor point and the user device, and
the one or more instructions, that cause the one or more processors to designate the first network device as the designated network device, cause the one or more processors to:
apply a weight to each rule, of the set of rules, to generate a weighted set of rules,
determine scores for a plurality of first network devices based on the weighted set of rules, and
select the first network device, from the plurality of first network devices, based on a score for the first network device being greater than scores associated with one or more other network devices from the scores for the plurality of first network devices;
provide, to the user device, information informing the user device that the designated network device is to be the IP anchor point for the application; and
provide, to the network, information instructing the network to utilize the designated network device as the IP anchor point for the application to permit the user device to utilize the designated network device as the IP anchor point for the application.

7. The non-transitory computer-readable medium of claim 6, wherein the instructions further comprise:
one or more instructions that, when executed by the one or more processors, cause the one or more processors to:
provide, to the network, information instructing the network to utilize a third network device of the network as a control plane anchor point for the application of the user device.

8. The non-transitory computer-readable medium of claim 6, wherein:
the first network device is a user plane function (UPF) device provided at an edge of the network, and
the second network device is a UPF device provided at a central location of the network.

9. The non-transitory computer-readable medium of claim 6, wherein:
the low latency application includes one or more of:
an autonomous driving application,
a real-time vehicle-to-vehicle (V2V) communication application, or
an application that delivers video; and
the best effort application includes one or more of:
an application to enable a web download, or
an application to access the Internet.

10. The non-transitory computer-readable medium of claim 6, wherein the instructions further comprise:
one or more instructions that, when executed by the one or more processors, cause the one or more processors to:
receive, from the user device, information indicating that a user stopped utilizing the application; and
provide, to the network, information instructing the network to stop utilizing the designated network device as the IP anchor point for the application.

11. A method, comprising:
receiving, by a device, information indicating that a user device is utilizing an application associated with a network;
determining, by the device, whether the application is a low latency application or a best effort application;
designating, by the device, a first network device of the network or a second network device of the network as a designated network device to be an Internet protocol (IP) anchor point for the application based on a set of rules and based on determining whether the application is the low latency application or the best effort application,
the first network device being designated as the designated network device to be the IP anchor point for the application when the application is the low latency application, or
the second network device being designated as the designated network device to be the IP anchor point for the application when the application is the best effort application,
wherein the set of rules includes two one or more of:
a rule indicating that the IP anchor point is to be as close to the user device as possible,
a rule indicating that the IP anchor point is to include a threshold amount of processing resources and memory resources,
a rule indicating that the IP anchor point is to be associated with a serving base station,
a rule indicating a timing advance distance between the IP anchor point and the user device, or
a rule indicating an operational pathloss between the IP anchor point and the user device, and
designating the first network device as the designated network device comprising:
applying a weight to each rule, of the set of rules, to generate a weighted set of rules,
determining scores for a plurality of first network devices based on the weighted set of rules, and
selecting the first network device, from the plurality of first network devices, based on a score for the first network device being greater than scores associated with one or more other network devices from the scores for the plurality of first network devices;
providing, by the device and to the user device, information informing the user device that the designated network device is to be the IP anchor point for the application; and
providing, by the device and to the network, information instructing the network to utilize the designated network device as the IP anchor point for the application to permit the user device to utilize the designated network device as the IP anchor point for the application.

12. The method of claim 11, further comprising:
providing, to the network, information instructing the network to utilize a third network device of the network as a control plane anchor point for the application of the user device.

13. The method of claim 11, wherein:
the first network device is a user plane function (UPF) device provided at an edge of the network, and
the second network device is a UPF device provided at a central location of the network.

14. The method of claim 11, wherein:
the low latency application includes one or more of:
- an autonomous driving application,
- a real-time vehicle-to-vehicle (V2V) communication application, or
- an application that delivers video; and the best effort application includes one or more of:
- an application to enable a web download, or
- an application to access the Internet.

15. The method of claim 11, further comprising:
receiving, from the user device, information indicating that the user stopped utilizing the application; and
providing, to the network, information instructing the network to stop utilizing the designated network device as the IP anchor point for the application.

16. The device of claim 1, wherein the one or more processors, when determining whether the application is the low latency application or the best effort application, are to:
determine that the application is the low latency application based on a maximum allowed latency for the application.

17. The device of claim 1, wherein the one or more processors, when applying the weight to each rule of the set of rules, are to:
apply different weights to different rules based on one or more of:
- information associated with the user device,
- information associated with the application, or
- information associated with the network.

18. The non-transitory computer-readable medium of claim 6, wherein the one or more instructions, that cause the one or more processors to determine whether the application is the low latency application or the best effort application, cause the one or more processors to:
determine that the application is the low latency application based on a maximum allowed latency for the application.

19. The non-transitory computer-readable medium of claim 6, wherein the one or more instructions, that cause the one or more processors to apply the weight to each rule of the set of rules, cause the one or more processors to:
apply different weights to different rules based on one or more of:
- information associated with the user device,
- information associated with the application, or
- information associated with the network.

20. The method of claim 11, wherein determining whether the application is the low latency application or the best effort application comprises:
determining that the application is the low latency application based on a maximum allowed latency for the application.

* * * * *